United States Patent [19]

Hudson

[11] 4,024,801

[45] May 24, 1977

[54] EXTENDED INSULATED HOT HEAD PISTON WITH EXTENDED INSULATED HOT CYLINDER WALLS

[76] Inventor: Perry David Hudson, Corpus Christi, Tex.

[22] Filed: Oct. 14, 1971

[21] Appl. No.: 189,153

Related U.S. Application Data

[62] Division of Ser. No. 74,703, Sept. 23, 1970.

[52] U.S. Cl. .................................. 92/86.5; 92/144; 92/176; 92/215

[51] Int. Cl. .......................... F16j 1/00; F16l 59/00

[58] Field of Search ............. 92/84, 86.5, 144, 176, 92/215, 256; 123/41.35, 191 A, 193 CP

[56] References Cited

UNITED STATES PATENTS

| | | | |
|---|---|---|---|
| 1,156,590 | 10/1915 | Davol | 92/215 X |
| 1,190,830 | 7/1916 | Wentworth | 123/191 A |
| 1,557,987 | 10/1925 | Coryell | 92/215 X |
| 2,359,672 | 10/1944 | Penco | 123/193 CP |
| 3,136,306 | 6/1964 | Kamm | 92/176 X |
| 3,187,643 | 6/1965 | Pope | 92/176 |
| 3,623,463 | 11/1971 | DeVries | 92/176 |

*Primary Examiner*—Irwin C. Cohen

[57] ABSTRACT

This invention relates to reciprocating piston engines using single acting pistons operating in liquid cooled and lubricated cylinders, said pistons have piston extensions slightly smaller in diameter than the main power pistons and the length of the stroke, operating inside slightly larger, insulated, hot cylinder extensions. Operating in co-operation with a cold air blocking system which fills the clearance space between the piston extension and the hot cylinder wall liner with cool air when the piston is at or near top dead center. Thus keeping the hot pressure fluid medium from coming in contact with the liquid cooled and lubricated cylinder walls in which the main power piston operates. Thereby cutting down the heat losses to the cooling medium.

This invention relates to novel methods of securing the hot piston extension to the main power piston in a way that allows for the difference in expansion from the heat of the hot pressure fluid medium, and still holds the piston extension firmly secured and centered radially with the main piston at all temperatures. Insulation is provided between the main piston and piston extension.

7 Claims, 3 Drawing Figures

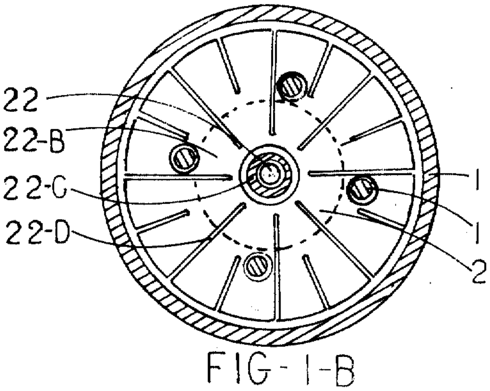
FIG-1-B
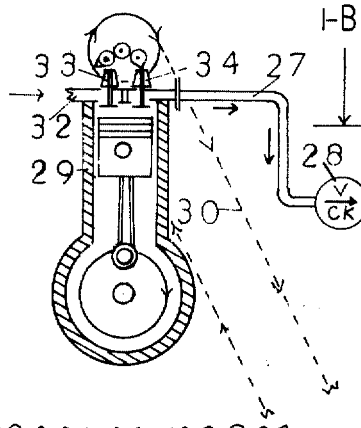
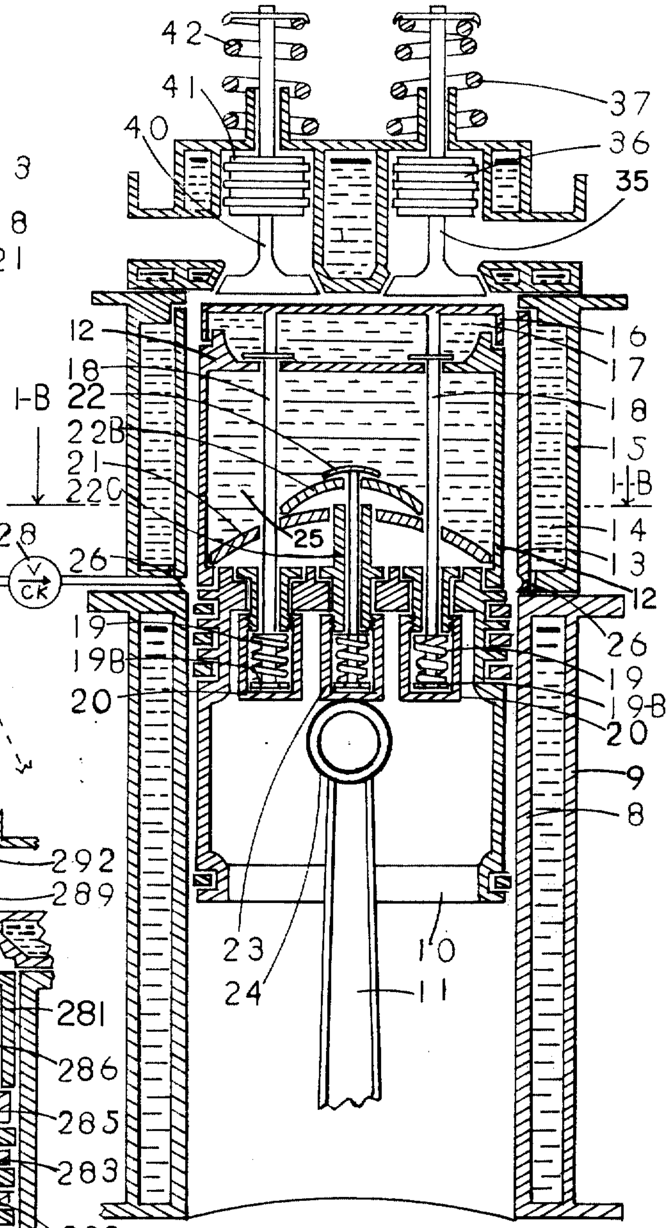
FIG-1-A.
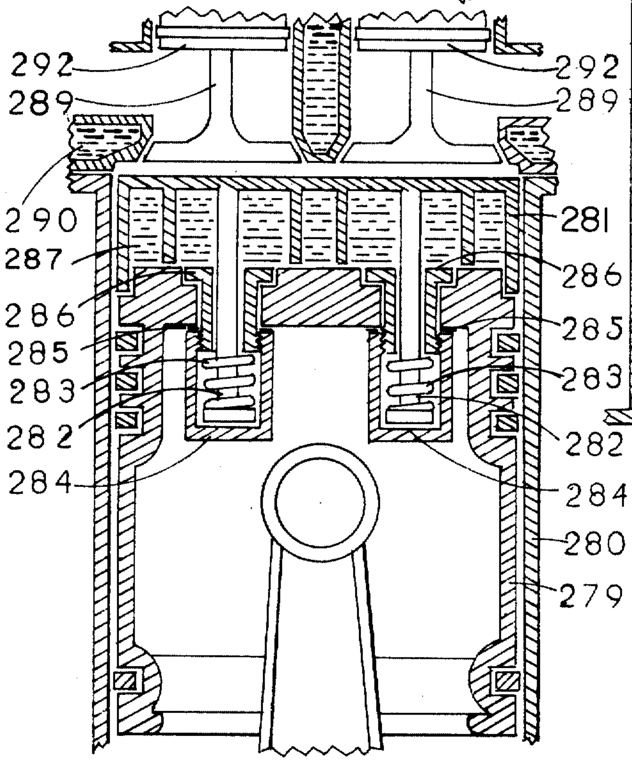
FIG-2
INVENTOR

EXTENDED INSULATED HOT HEAD PISTON WITH EXTENDED INSULATED HOT CYLINDER WALLS

This application is a division of application Ser. No. 74,703, filed Sept. 23, 1970.

This invention relates to reciprocating piston engines using single acting pistons operating in liquid cooled, lubricated cylinders. The pistons have piston extensions slightly smaller in diameter than the main pistons and the length of the stroke, operating inside slightly larger; insulated hot cylinder liner extensions. The piston operates in co-operation with a cold air blocking system which fills the clearance space between the piston extension and the hot cylinder wall liner with cool air when the piston is on top dead center thus keeping the hot fluid medium from coming into contact with the liquid cooled cylinder wall in which the main piston operates and thereby cutting down on the heat losses.

This invention relates to novel methods of securing the hot piston extension to the main piston in a way that allows for the difference in expansion from the heat of the hot fluid medium, and still holds the piston extension firmly secure to the main piston and centered radially at all temperatures.

This invention also relates to a hot insulated piston head on the main piston which protects the main piston from contact with the hot fluid medium. Thus cutting down on the heat losses.

This invention relates to a novel method of securing the hot piston head to the main piston in such a manner that allows for the difference in expansion from the heat of the hot fluid medium and still holds the hot piston firmly secured to the main piston at all temperatures. This hot head for the the main piston insulates the main piston from the heat from the hot fluid medium.

FIG. 1-A, shows a cross section in elevation of the lubricated, liquid cooled cylinder with the insulated hot cylinder liner and hot pressure cylinder in place, and the hot insulated piston extension in place. This drawing shows the novel means of securing the piston extension to the main piston in a manner to allow for the expansion of the parts by the heat of the fluid medium. And still keep the extension centered on the main piston at all times.

FIG. 1-B shows a plan view on section lines 1-B and 1-B, FIG. 1-A of the piston extension retainer and centering disc 21.

FIG. 2, shows a section view in elevation, of a "hot head" piston for use in an engine using hot gases as a pressure fluid medium. The "hot head" is insulated from the main piston, thereby transmitting less heat to the piston and cylinder walls.

It should be understood that the description and drawings are illustrative merely, and various modifications and changes may be made in the structure disclosed without departing from the spirit of the invention. Like numerals refer to like parts throughout the several views.

FIG. 1-A, shows a cross section in elevation of the lubricated, liquid cooled cylinder with the insulated hot cylinder liner and hot piston extension in place. This drawing shows the novel means of securing the piston extension to the main piston in a manner to allow for difference in expansion of the different parts by the heat of the fluid medium. Also to keep the extension centered with the main piston at all times. Thus allow the hot extension and the clyinder liner to operate with less clearance.

The power cylinder is 8 with liquid cooling jacket 9. The main power piston is 10 and is connected to the crankshaft by connecting rod 11. The extension on the hot head piston is 12 with the hot cylinder wall 13 insulated by insulation 14 from the outer pressure holding cylinder wall 15. Hot piston head 16 is insulated by insulation 17 from piston extension 12 and is secured by bolts 18 — 18 to power piston 10 tensioned by stiff holding springs 19 — 19 secured by bolt nut 19B and sealed pressure tight by caps 20 — 20. Circular clamp 21 is pressured by bolt 22 which holds hot head and piston extension secured and centered to main power piston 10 by tension spring 23 and sealed pressure tight by cap 24 and insulated by insulation 25 from main piston 10.

FIG. 1-B shows a plan view on section lines 1B — 1B of FIG. 1. piston extension retainer and centering disc 21 which is pressured by spring 23B via clamping rod 22 and clamping rod washer 22B. This forces the circular disc clamp 21 downward in the center springing the sections between slots 22D outward exerting pressure against the inside shoulder of piston extension 12 as disc 21 fits guide bushing 22C with a sliding fit this action centers the the piston extension 13 with the main piston 10 at all times.

Hot cylinder wall 13 has a blocking air distributor groove 26—26 all the way around the bottom. Said groove is in communication with blocking air conduit 27 via check valve 28 and supplied by blocking air metering mechanism 29. This metering mechanism consists of a small reciprocating piston compressor driven at crankshaft speed of the engine by silent chain 30 from the camshaft which is driven at crankshaft speed by silent chain 31—31 from main engine crankshaft.

This metering mechanism is supplyed with cool 600 PSI air from a compressor. The blocking air is designed to keep the hot gases away from the main pressure sealing piston 10 and the lubricated cylinder wall 8 and to conserve the heat in the hot gases. The piston extension 12 clears the hot cylinder wall 13 by 0.010 to 0.040 thousandths of an inch. Cylinder wall 13 is insulated from the outer pressure holding cylinder wall 15 by insulation 14 and is fit to allow expansion vertically and in diameter when hot. The compression of holding springs 19—19 and 23 holds the piston extension fast to the main piston put allows for vertical and in diameter expansion. Clamp 21 and holding bolt 22 hold it centered with the main pressure sealing power piston 10. The blocking air compressor and metering divice is 29 which is driven at crankshaft speed and in exact time with the crankshaft by silent chain from the main engine crankshaft.

The volume displacement capacity of the blocking air piston in compressor 29 is the same or slightly more than the volume capacity of the of the 0.010 to 0.040 thousands of an inch clearance between the hot cylinder wall 13 and hot piston extension wall 12 when the main piston is on top dead center. As the piston 10 travels on the exhaust stroke; the clearance space between the piston extension wall and the cylinder walls is filled with cool blocking air at 600 PSI, or less so when highpressure charge valve 35 FIG. 1 opens the hot gases cannot go into the clearance space. As piston goes down on the power stroke the hot gases above the piston holds the cool air in the clearance space. Thus preventing the hot gases from contacting the cool lubricated cylinder walls of the main piston. On the upward exhaust stroke the air in the clearance space is forced out by the fresh charge of blocking air. Thus the hot gases does not come in contact with nothing but the hot cylinder 13 and hot piston extension 12 and hot piston head 16. For this reason very little heat is lost. Air is supplied to air blocking compressor via inlet 32 through mechanical operated inlet valve 33, and discharged through valve 34.

FIG. 2 shows a sectional view in elevation of a "hot head" piston for use in an engine using hot gases as a pressure fluid medium. The "hot head" is insulated from the main piston, thereby transmitting less heat to the piston and cylinder walls. This is an advantage in that it keeps the piston cooler and there is less heat loss from the pressure fluid medium used for power. As all of these engines have combustion air preheaters from the exhaust gases, this makes for better thermal efficiency.

The main piston casting is 279. The cooled cylinder wall is 280. The hot head cap 281 is held in place by studs 282—282 and pressured by springs 283—283 and sealed off pressure tight by caps 284—284 tightened against gaskets 285 and held by bushings 286. The tension springs 283—283 allows for the expansion of hot head 281 and studs 282—282. Hot head 281 is made of heat resistant material and is insulated from the main power piston by insulation means 287. The inlet and exhaust valves are 289—289. The cylinder head is 290. The valve springs are 291. The valve stem equalizing pistons are 292—292.

With the foregoing and other objects in view, the invention resides in the novel arrangement and combination of parts and in details of construction as hereinafter described and claimed. It being understood that changes in the precise embodiment of the invention disclosed may be made within the scope of what is claimed without departing from the spirit of the invention. Therefore, the invention is not limited by what is shown in the drawings and described in the specifications, but only as indicated in and by the appended claims.

I claim:

1. In combination, a reciprocating piston engine, designed to use a hot pressure fluid medium, comprising a main power piston having a head and a skirt including piston seal rings thereon, a cylinder supporting said main power piston for reciprocation therein, a cylinder extension supported above said cylinder, the inside diameter of said cylinder extension being slightly larger than the inside diameter of said cylinder, a jacket of insulation surrounding said cylinder extension, a pressure holding cylinder extension surrounding said jacket of insulation, a piston extension movable relative to said main piston, said piston extension having a slightly smaller outside diameter than the outside diameter of said main power piston, means for securing said piston extension to said main power postion to provide for said relative movement, said means comprising at least one opening in said main power piston head, at least one bolt means secured to said piston extension and extending through said opening, a bolt nut means secured to the end of said bolt means extending through said opening, a spring biasing means acting on said bolt nut means, and a pressure sealing cap means removably secured to said opening and securing and covering said bolt means end, said nut means, and said spring biasing means to provide a pressure tight joint.

2. In combination, a reciprocating piston engine, designed to use a hot pressure fluid medium, comprising a main power piston having a head and a skirt including piston seal rings thereon, a cylinder supporting said main power piston for reciprocation therein, a cylinder extension supported above said cylinder, the inside diameter of said cylinder extension being slightly large than the inside diameter of said cylinder, a jacket of insulation surrounding said cylinder extension, a pressure holding cylinder extension surrounding said jacket of insulation, a piston extension movable relative to said main power piston, said piston extension having a slightly smaller outside diameter than the outside diameter of said main power piston and further having an internal shoulder, means for centering radially with, and securing said piston extension to said main power piston to provide for said relative movement, said means comprising at least one opening in said main piston head, a round hollow guide bushing extending upward from said opening in the exact center of the head of said main power piston, a circular concave clamping disc, slotted radially for expansion, the outer perimeter of said concave clamping disc, to radially engage the shoulder of said piston extension, said concave clamping disc has a round hole in the exact center which is movably fit around said round hollow guide bushing, a clamping bolt nut means having a large concave head and a large concave pressure washer, engaging said circular concave disc and extending through said hollow guide bushing and said opening in the head of said main power piston, a spring biasing means acting on said bolt nut clamping means, and a pressure sealing cap means removably secured to said opening and securing and covering said bolt means end, said nut means, and said spring biasing means to provide a pressure tight joint, whereby the said spring biasing means puts a downward pressure on said concave clamping disç, causing said concave clamping disc to expand in circumference against the inside of said piston extension, holding said piston extension secured to and centered with, said main power piston at all temperatures.

3. In combination, a reciprocating piston engine, designed to use a hot pressure fluid medium, comprising a main power piston having a head and a skirt including piston seal rings thereon, a cylinder supporting said main power piston for reciprocation therein, a cylinder extension supported above said cylinder, the inside diameter of said cylinder extension being slightly larger than the inside diameter of said cylinder, a jacket of insulation surrounding said cylinder extension, a pressure holding cylinder extension surrounding said jacket of insulation, a piston extension movable relative to said main power piston, said piston extension having a slightly smaller outside diameter than the outside diameter of said main power piston, means for securing said piston extension to said main power piston to provide for said relative movement, said means comprising at least one opening in said main power piston head, at least one bolt means secured to said piston extension and extending through said opening, a bolt nut means secured to the end of said bolt means extending through said opening, a spring biasing means acting on said bolt nut means, a pressure sealing cap removably secured to said opening and securing and covering said bolts means end, said nut means, and said spring biasing means to provide a pressure tight joint, a means to to exclude the hot pressure fluid medium from the clearance space between said piston extension, said cylinder and said cylinder extension, on the power stroke, consisting of a air distributor means which is a groove around the lower inside edge of said cylinder extension, which is in communication with a air metering means which injects a predetermined amount of compressed air into said distribution groove at a predetermined point in the piston stroke, whereby hot pressure fluid medium is excluded from the clearance space between said piston extension, said cylinder and said cylinder extension, thereby, preventing contact by the hot pressure fluid medium with the cooled and lubricated cylinder walls and consequent heat loss from the hot pressure fluid medium to the cooling medium.

4. In combination, a reciprocating piston engine, designed to use a hot pressure fluid medium. comprising a main power piston having a head and a skirt including piston seal rings thereon, a cylinder supporting said main power piston for reciprocation therein, a cylinder extension supported above said cylinder, the inside diameter of said cylinder extension being slightly larger than the inside diameter of said cylinder, an insulation means surrounding said cylinder extension, a pressure holding cylinder extension surrounding said insulation means, a piston extension movable relative to said main power piston, said piston extension havin a slightly smaller outside diameter than the outside diameter of said main power piston, means for securing said piston extension to said main power piston to provide for said relative movement, said means comprising at least one opening in said main power piston head, at least one bolt means secured to said piston extension and extending through said opening, a bolt nut means secured to the end of said bolt means extending through said opening, a spring biasing means acting on said bolt nut means, and a pressure sealing cap means secured to said opening and securing and covering said bolt means end, said nut means, and said spring biasing means to provide a pressure tight joint, and a means of insulating said main power piston from the heat of the piston extension, consisting of an insulating means placed between said piston extension and said main power piston head.

5. In combination, a reciprocating piston engine, designed to use a hot pressure fluid medium, comprising a main power piston having a head and a skirt including piston seal rings thereon, a cylinder supporting said main power piston for reciprocation therein, a cylinder extension supported above said cylinder, the inside diameter of said cylinder extension being slightly larger than the inside diameter of said cylinder, an insulation means surrounding said cylinder extension, a pressure holding cylinder extension surrounding said insulation means, a piston extension movable relative to said main power piston, said piston extension having a slightly smaller outside diameter than the outside diameter of said main power piston and further including an internal shoulder, means for securing said piston extension to said main power piston to provide for relative movement, said means comprising at least one opening in said main power piston head, a round hollow guide bushing extending upward from said opening in the exact center of the head of said main power piston, a circular concave clamping disc, slotted radially for expansion, the outer perimeter of said concave clamping disc, to radially engage the shoulder of said piston extension, said concave clamping disc has a round hole in the exact center which is movably fit around said round hollow guide bushing, a clamping bolt nut means having a large concave head and a large concave pressure washer engaging said circular concave disc and extending through said hollow guide bushing and said opening in the head of said main power piston, a spring biasing means acting on said bolt nut clamping means, and a pressure sealing cap removably secured to said opening and securing and covering said bolt means end, said nut means, and said spring biasing means to provide a pressure tight joint, and a means of insulating said main power piston from the heat of the piston extension, consisting of an insulating means placed between said piston extension and said main power piston head.

6. In combination, a reciprocating piston engine, designed to use a hot pressure fluid medium, comprising a main power piston having a head and a skirt including piston seal rings thereon, a cylinder supporting said main power piston for reciprocation therein, a cylinder extension supported above said cylinder, the inside diameter of said cylinder extension being slightly larger than the inside diameter of said cylinder, an insulation means surrounding said cylinder extension, a pressure holding cylinder extension surrounding said insulation means, a piston extension movable relative to said main power piston, said piston extension having a slightly smaller outside diameter than the outside diameter of said main power piston, means for securing said piston extension to said main power piston to provide for said relative movement, said means comprising at least one opening in said main power piston head, at least one bolt means secured to said piston extension and extending through said opening, a bolt nut means secured to the end of said bolt means extending through said opening, a spring biasing means acting on said bolt nut means, and a pressure sealing cap means secured to said opening and securing and covering said bolt means end, said nut means, and said spring biasing means to provide a pressure tight joint, a means to exclude hot pressure fluid medium from the clearance space between said piston extension, said cylinder and said cylinder extension, on the power stroke, consisting of an air distributor means which is a groove around the lower inside edge of said cylinder extension, which is in communication with a air metering means which injects a predetermined amount of compressed air into said distribution groove at a predetermined point in the piston stroke, and a means of insulating said main power piston from the heat of the piston extension, consisting of an insulating means placed between said piston extension and said main power piston head.

7. In combination, a reciprocating piston engine designed to use a hot pressure fluid medium, comprising a main power piston having a head and a skirt including piston seal rings thereon, a cylinder supporting said main piston for reciprocation therein, a piston extension movable relative to said main power piston, said piston extension having a slightly smaller outside diameter than the outside diameter of said main power piston, a means for securing said piston extension to said main power piston to provide for said relative movement, said means comprising at least one opening in said main power piston head, at least one bolt means secured to said piston extension and extending through said opening, a bolt nut means secured to the end of said bolt means extending through said opening, a spring biasing means acting on said bolt nut means, a pressure sealing cap means removably secured to said opening and securing and covering said bolt means end, said nut means, and said spring biasing means to provide a pressure tight joint, and a means of insulating said main power piston from the radiant heat from said piston extension, consisting of an insulating means placed between said piston extension and said main power piston.

* * * * *